May 15, 1962 F. WICKS 3,034,668
PIPE HANDLING MACHINE
Filed July 10, 1959 3 Sheets-Sheet 1
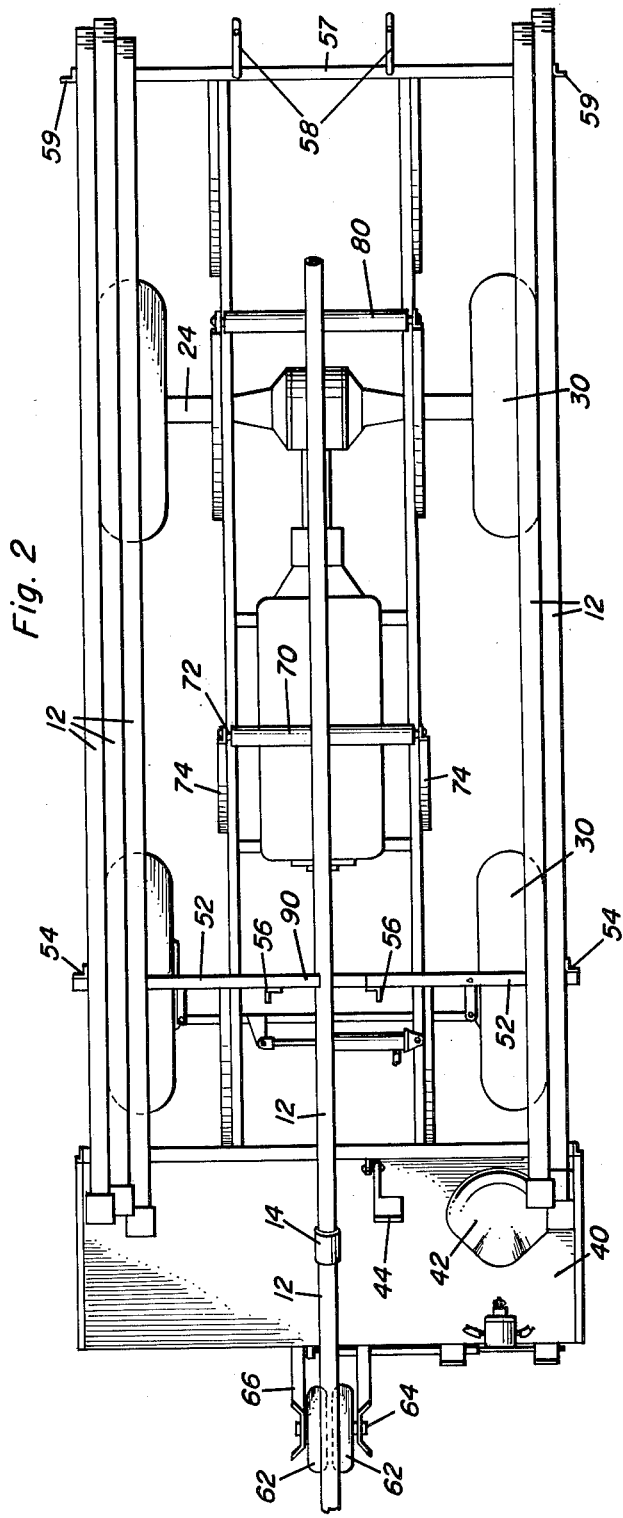
Frederick Wicks
INVENTOR.
BY *Clarence A. O'Brien*
*and Harvey B. Jacobson*
Attorneys May 15, 1962   F. WICKS   3,034,668
PIPE HANDLING MACHINE
Filed July 10, 1959   3 Sheets-Sheet 2

Frederick Wicks
INVENTOR.
BY *Clarence A. O'Brien*
and *Harvey B. Jacobson*
Attorney May 15, 1962 F. WICKS 3,034,668
PIPE HANDLING MACHINE
Filed July 10, 1959 3 Sheets-Sheet 3

Frederick Wicks
INVENTOR.

BY *Clarence A. O'Brien*
*and Harvey B. Jacobson*
Attorneys

United States Patent Office 3,034,668
Patented May 15, 1962

3,034,668
PIPE HANDLING MACHINE
Frederick Wicks, Wicks Road, Commack, N.Y.
Filed July 10, 1959, Ser. No. 826,350
5 Claims. (Cl. 214—83.1)

This invention comprises a novel and useful pipe handling machine and more particularly relates to an apparatus to facilitate the laying or removing of irrigation pipe in a field.

In many agricultural areas it is necessary to use from time to time an irrigation pipe system which is laid through the field being cultivated in order to supply the necessary moisture for effective production of the crops. The laying of the irrigation pipe when needed and its removal when its services are no longer required involves a very considerable amount of labor and frequently subjects the crops being cultivated to unavoidable damage.

It is the primary object of this invention to provide an apparatus specifically adapted to facilitate the laying or removing of such pipe.

A further and more specific purpose of the apparatus is to provide a pipe laying machine which is especially adapted for handling the pipe sections of a pipe line for either laying or removing the same and especially pipe lines for irrigation pipes and the like.

A further object of the invention is to provide an apparatus in accordance with the preceding objects wherein the handling of the pipe sections of a pipe line is facilitated to such an extent that only one person is necessary to operate the machine and lay or remove the pipes.

A further object of the invention is to provide an apparatus specifically adapted for the handling of pipe sections and which shall have a slow speed of travel adjustable up to about one mile per hour and either forward or backward in order that the operator may handle the pipe sections for connecting the same to or removing the same from a pipe line without interrupting the continuous travel of the apparatus.

A further and more specific object of the invention is to provide an apparatus in accordance with the foregoing objects which shall consist of a self-propelled chassis having pipe racks for storage of pipes, lifting rollers to facilitate the lifting and lowering of the pipe between the racks and the ground, and with the control means and the structure and the mechanism being so arranged and disposed thereon that ample space is provided for the operator to perform the necessary operations in the connecting or disconnecting of pipe sections and to control the apparatus.

Another important object of the invention in accordance with the immediately preceding object is to provide an apparatus with the pipe storage racks arranged for overhead storage of the pipe sections together with means to facilitate the elevating and lowering of the pipes between the racks and the ground.

A still further object of the invention is to provide an apparatus of light we ight upon the ground in order to avoid damaging the root systems of crops when the apparatus is propelled through cultivated fields for laying or removing pipes therein.

A further and important object of the invention is to provide an apparatus having such a disposition of the overhead pipe racks that the series of longitudinally spaced lifting rollers having their axes disposed in parallel relation in an inclined plane which inclines forwardly and downwardly of the apparatus whereby pipe sections may be moved between the storage racks and the ground by means of these rollers and will pass between laterally spaced storage racks on the machine.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view showing a suitable form of pipe handling machine constructed in accordance with the principles of this invention and illustrating the operation of the same in either connecting or disconnecting sections of pipe from a pipe line;

FIGURE 2 is an enlarged top plan view of the apparatus of FIGURE 1;

In FIGURE 1 there is designated generally by the numeral 10 a self-propelled pipe handling machine in accordance with the principles of this invention which is shown in operation for handling sections of pipe 12 which are adapted to be secured as by couplings 14 to form a pipe line 16 for irrigation or for other purposes.

Figure 3:
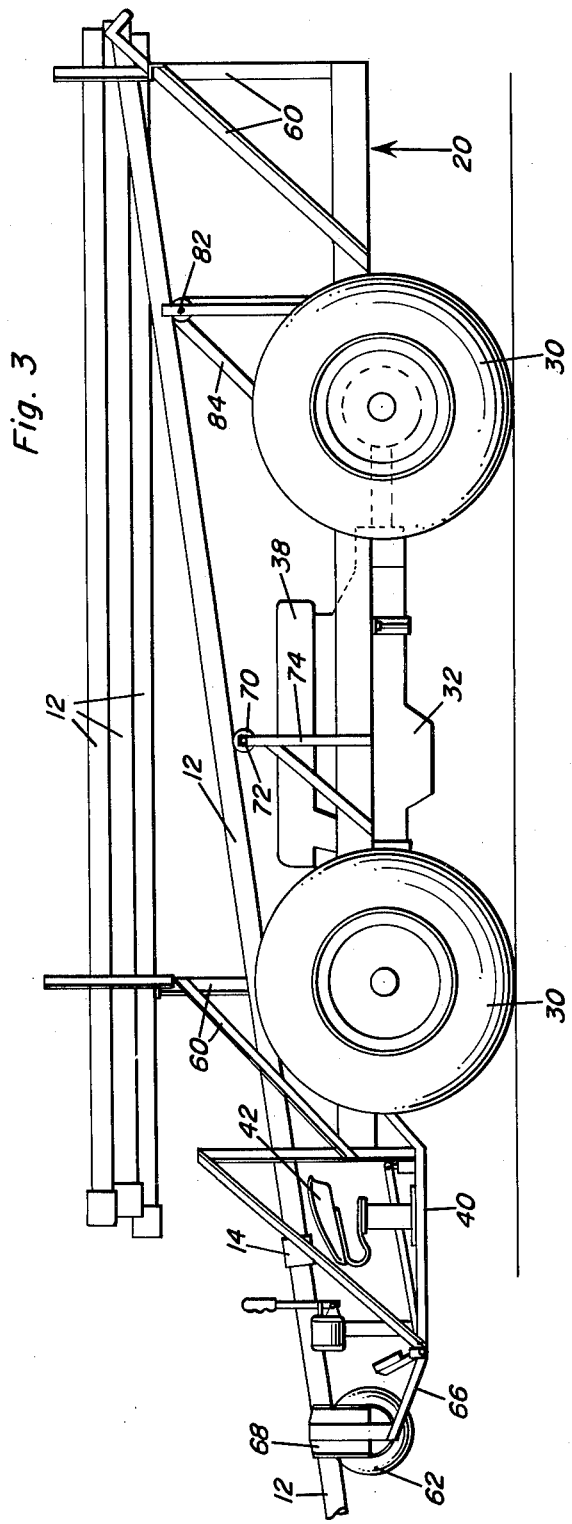
FIGURE 3 is a side elevational view of the apparatus of FIGURE 2.
Figure 7:
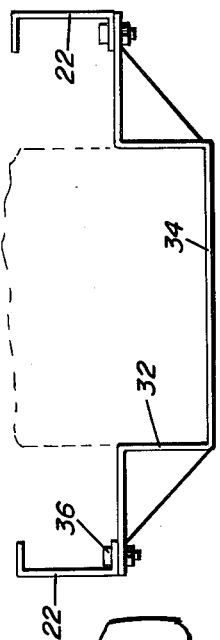
FIGURE 7 is a detail view of a portion of the chassis of the apparatus.
Figure 6:
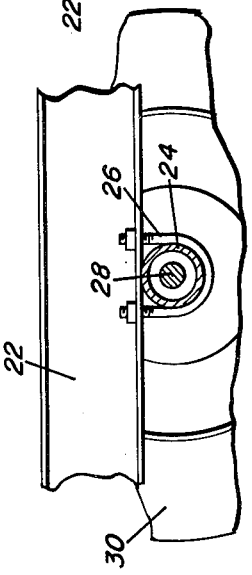
FIGURE 6 is a detail view in vertical longitudinal section taken substantially upon the plane indicated by the section line 6—6 of FIGURE 5 and showing a detail of the construction of the chassis of the apparatus.

The pipe handling machine 10 includes a suitable chassis or framework 20 which preferably comprises the usual side frame members 22 having any suitable axle housings 24 secured thereto and therebeneath as by U-bolts 26, whereby the axles 28 with their supporting wheels 30 serve to support and propel the apparatus. As shown in FIGURE 7, intermediate their ends the side frame members 22 are provided with a depressed transversely extending platform member 32 having a centrally recessed bottom portion 34, this platform being secured to frame members as by fastening bolts 36. The bottom portion 34 serves to support and mount the power plant 38 of the apparatus, which may be of any suitable type, this power plant being shown as mounted between the front and rear wheels in FIGURES 2 and 3 in particular. Obviously, however, the power plant can be mounted at the rear end of the vehicle if desired.

The power plant is of any suitable type, and is of relatively low power, as for example about 30 horsepower, since it is of a character which is adapted to propel the vehicle at an extremely low rate of speed across a field, as for example at speeds up to about one mile per hour.

The wheels 30 are rubber tired pneumatic wheels and are of sufficient size to spread the load of the machine over a wide area of ground and thereby prevent the wheels from digging into soft ground and damaging the root systems of the growing crops in the field through which the pipe line is to be laid or removed.

At the forward end of the machine there is provided a relatively lower forwardly projecting platform 40 which serves to support the seat 42 of the driver as well as the various controls for the power plant and for the driving of the apparatus. As will be observed from FIGURE 2, the platform 40 extends across the entire transverse width of the machine so that the driver may move completely thereacross during his work. It may be here noted that any suitable steering and control mechanism for the vehicle may be provided, the driver occupying the seat 42 when the machine is travelling from one location to another, and is not engaged in handling pipe, while during the operation of laying or disconnecting pipe, the driver stands and moves about upon the platform 40 with the machine being preferably continuously in motion during this operation, being controlled solely by the combined clutch and brake pedal 44. Inasmuch as the other controls for the transportation and guiding of the apparatus are of any conventional type, and since their construction is not essential to the understanding of and the operation of the invention as set forth hereinafter, a further description of the same is deemed to be unnecessary.

Figure 5:
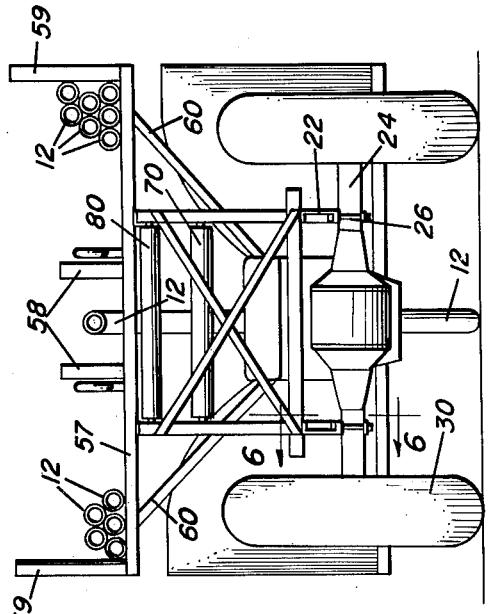
FIGURES 4 and 5 are front and rear elevational views respectively of the apparatus of FIGURES 2 and 3.

Securely mounted upon the chassis and disposed in a horizontal plane thereabove are a pair of laterally spaced longitudinally extending storage racks each indicated generally by the numeral 50. These racks comprise longitudinally spaced horizontal support members 52 having vertical end members 54 and 56 on their outer and inner ends respectively, and being disposed in laterally spaced pairs as will be apparent from FIGURE 4. At the rear end of the apparatus as shown in FIGURE 5, there may be provided a single cross member 57 extending entirely across the width of the apparatus and of the same over-all length as the pair of forwardly disposed support members 52 of FIGURE 4, the rearward support member 57 having end members 59 together with a pair of vertical upstanding members 58 and cooperates with the forward racks 50 for the reception of pipe sections 12 therein as illustrated. It will be understood that there may be provided a single one of the support members 52 at the forward end of the rack assembly which cooperates with the rearward support member; or there may be intermediate members similar to and of the same construction as the members 52 of FIGURE 4 along the length of the racks as may be found desirable.

The horizontal support members 52, 57 are mounted upon the chassis and upon the frame members 22 thereof in any desired manner, being retained and supported thereon as by suitable support and brace members 60.

As will be observed, the braces and supports 60 are disposed rearwardly of the platform 40 for the driver and position the pipe in an overhead manner and in two racks on opposite sides of the longitudinal medial or center line of the apparatus.

A plurality of support rollers are provided to assist in handling the pipe in moving it between the storage racks and the pipe line on the ground. Thus, there is provided a front or first pair of support rollers as at 62, journalled upon axle 64 carried by suitable support members 66 which in turn are mounted upon the platform 40 and thus are carried by the front portion of the chassis of the apparatus. The rollers 62 are rubber tired wheels of a small size positioned together so that they may support and carry a pipe passing thereover as will be readily understood from a comparison of FIGURES 1–4. A pair of guides or deflector plates 68 are likewise mounted upon the support 66 and are disposed on opposite sides of the front support rollers 62 to guide and retain the pipe line passing over these rollers.

Rearwardly of the front support rollers 62 there are provided longitudinally spaced support rollers. Thus there is provided an intermediate support roller 70 which may conveniently comprise a cylinder or sleeve rotatably carried by a rod 72 which in turn is supported between a pair of support frames 74 suitably mounted upon the chassis. A further and rearward roller 80 is likewise carried by an axle 82 which is secured transversely between the upper ends of a pair of support frames 84.

The rollers 70 and 80 together with the front rollers 62 are disposed with their axes in parallel relation and in a plane which is inclined forwardly and downwardly with respect to the chassis. The arrangement is such that the pipe sections passing over the series of rollers will move in a substantially straight line from a position upon the ground to a position adjacent and between the storage racks.

Figure 4:
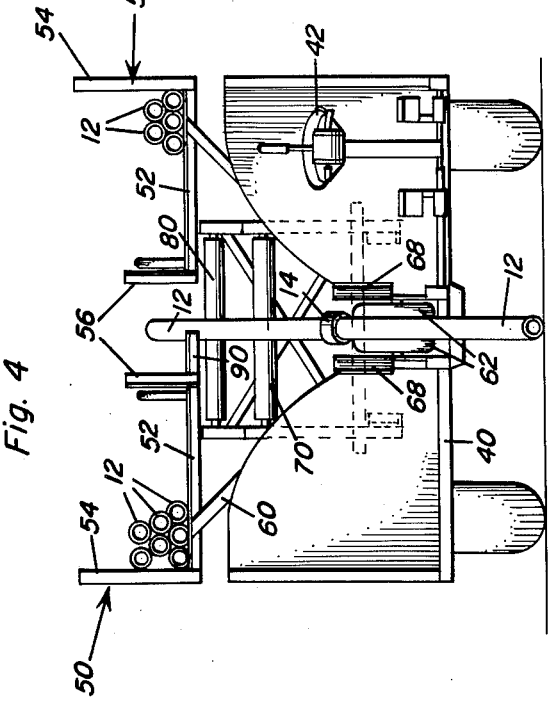

It will be observed that there is provided a fulcrum bar as at 90 which is suitably mounted upon and extends transversely of and above the chassis. Conveniently this fulcrum bar as shown in FIGURE 4 may be secured to or form a continuation of one of the support members 52 of the rack. This fulcrum bar extends into the passageway lying between the two adjacent edges of the two racks and serves to facilitate the tilting and shifting of the pipe sections 12 as they are moved between the support racks and the support rollers previously mentioned.

From the foregoing it is believed that the construction of the apparatus will be readily understood. The operation of the same is as follows: When it is desired to remove or disassemble a pipe line 16, the end pipe section of the same is lifted from the ground onto the top of the front roller 62. Thereupon the apparatus is placed in motion in a forward direction and by its travel will move the endmost portion of the pipe section up the series of support rollers, until the first coupling 14 passes the front support rollers and lies above the platform as shown in FIGURE 2.

As the machine slowly travels forward, feeding the pipe line onto the machine by means of the inclined series of rollers, the operator disconnects the joint 14. The section of pipe, now supported entirely by the series of rollers and moved upwardly into the space between the two support racks, may then have its end lifted by the operator through the passage or space means and lifted onto the fulcrum bar 90. Thereupon the operator may pull down upon the front end, thus tilting and lifting the rearward end and swinging it over the vertical ends 58 of the rearward section of the rack and resting it upon the rack. In turn the front end can then be lifted over the end members 56 of the front racks thereby placing the pipe in storage in a rack. It will be observed that the operator will place the control of the engine 38 for the desired slow forward speed which will afford him sufficient time to disconnect and store each pipe section as the forward progress of the machine progresses to the next joint 14 of the next section. It will be observed that the forward travel of the machine serves to apply the necessary force for lifting a pipe section up the series of rollers in position to be placed on a storage rack, so that all the operator need do is uncouple the pipe section and then swing it upwardly by means of the fulcrum bar into the proper storage rack.

When it is desired to lay a pipe the reverse operation is performed. The first section is lifted down from the storage rack, by means of the fulcrum bar and placed upon the upper end of the series of support rollers. The lower section is then slid down so that its lower end rests upon the ground. Thereupon the next section is down into place and coupled thereon. The machine is then started and the operation continues with successive section being removed from the storage rack, placed upon the support rollers, connected to the section of pipe already laid, and being withdrawn from the machine as the latter is propelled rearwardly by the motor 38.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a pipe handling machine, the combination of a self-propelled mobile chassis having front and rear ends, a pipe storage rack unit provided overhead on said chassis, said rack unit including a rear rack member extending transversely at the rear end of the chassis and a pair of transversely spaced front rack members at the front of the chassis whereby to provide an open space extending centrally longitudinally of the chassis between opposite side portions of the rack unit, a rotatable pipe engaging roller mounted on the chassis transversely of said open space below said rack unit and forwardly from the rear rack member thereof, a transversely elongated platform provided at the front end of the chassis forwardly from said front rack members of the rack unit, the transverse dimension of said platform being at least as long as the width of the rack unit, a control on said platform for said chassis whereby a single operator may drive the chassis and handle pipe placement in and from both side portions of said rack unit, bracket means projecting forwardly from the center of said platform, and rotatable pipe engaging roller means mounted in said bracket means below the level of said roller.

2. The device as defined in claim 1 together with a pipe engaging fulcrum bar projecting from one of said front rack members into said open space.

3. The device as defined in claim 1 wherein said roller means comprise a pair of juxtaposed coaxial rollers rotatably mounted in said bracket means.

4. The device as defined in claim 3 together with a pair of transversely spaced pipe guiding plates provided on said bracket means at opposite sides of said juxtaposed rollers and projecting above the latter.

5. The device as defined in claim 1 together with an additional rotatable pipe engaging roller mounted on said chassis transversely of said open space in forwardly and downwardly spaced relation from the first mentioned roller and rearwardly and upwardly spaced relation from said roller means.

References Cited in the file of this patent

UNITED STATES PATENTS

| | | |
|---|---|---|
| 2,523,832 | Kunkel | Sept. 26, 1950 |
| 2,526,583 | Schlessman | Oct. 17, 1950 |
| 2,559,703 | Bergman | July 10, 1951 |
| 2,704,162 | Johnson | Mar. 15, 1955 |
| 2,780,376 | Sanders | Feb. 5, 1957 |